United States Patent
Stefanini

(10) Patent No.: US 8,029,669 B2
(45) Date of Patent: Oct. 4, 2011

(54) FLUID TREATMENT METHOD AND APPARATUS

(75) Inventor: Daniel Stefanini, London (GB)

(73) Assignee: Hydropath Holdings Limited, London (GB)

( * ) Notice: Subject to any disclaimer, the term of this patent is extended or adjusted under 35 U.S.C. 154(b) by 927 days.

(21) Appl. No.: 11/793,706

(22) PCT Filed: Dec. 20, 2005

(86) PCT No.: PCT/GB2005/004944
§ 371 (c)(1),
(2), (4) Date: Dec. 18, 2007

(87) PCT Pub. No.: WO2006/067418
PCT Pub. Date: Jun. 29, 2006

(65) Prior Publication Data
US 2008/0185328 A1 Aug. 7, 2008

(30) Foreign Application Priority Data
Dec. 21, 2004 (GB) .................................. 0427898.2

(51) Int. Cl.
C02F 1/48 (2006.01)
B01D 35/06 (2006.01)
(52) U.S. Cl. ........ 210/223; 210/222; 210/243; 210/695; 210/748.01; 210/748.03; 210/748.05; 204/554; 204/570; 204/571; 204/660; 204/665
(58) Field of Classification Search .................. 210/222, 210/223, 243, 695, 748.01, 748.03, 748.05; 204/554, 570, 571, 660, 665
See application file for complete search history.

(56) References Cited

U.S. PATENT DOCUMENTS

| 1,715,932 | A | * | 6/1929 | Kokatnur | ...................... 426/388 |
| 3,801,482 | A |   | 4/1974 | King |  |
| 5,326,446 | A |   | 7/1994 | Binger |  |
| 5,667,677 | A | * | 9/1997 | Stefanini | ...................... 210/222 |
| 5,935,433 | A |   | 8/1999 | Stefanini |  |
| 5,951,856 | A | * | 9/1999 | Cho | .............................. 210/138 |
| 2004/0084381 | A1 |   | 5/2004 | Korenev |  |

FOREIGN PATENT DOCUMENTS

| DE | 3443810 A1 | 5/1986 |
| WO | WO9200916 A | 1/1992 |
| WO | WO9508510 A | 3/1995 |
| WO | WO9852876 A | 11/1998 |

OTHER PUBLICATIONS

Written Opinion for PCT/GBG2005/004944, Feb. 24, 2006.*

* cited by examiner

Primary Examiner — David A Reifsnyder
(74) Attorney, Agent, or Firm — Kirschstein, et al.

(57) ABSTRACT

Apparatus for treating a fluid in a conduit, comprising first and second core elements of magnetically conductive material adapted to be mounted to the conduit to surround same at spaced positions therealong; and means for establishing radio frequency magnetic fluxes in said core elements, for generating respective electromagnetic fields in the fluid to be treated extending from spaced positions along the conduit.

6 Claims, 2 Drawing Sheets

FLUID TREATMENT METHOD AND APPARATUS

BACKGROUND OF THE INVENTION

This invention relates to a method of, and apparatus for, treating a fluid, particularly an aqueous fluid, in a conduit to kill bacteria therein and cause flocculation of suspended solid matter.

Chemical treatment is usually used to kill bacteria and/or to cause flocculation of suspended solids in water supply systems, heating systems and so forth. For example, chlorine gas can be introduced to the water and be dissolved therein to kill bacteria, the concentration of the dissolved chlorine being monitored and maintained at a bacteria-killing level. Ozone has also been used for this purpose, being introduced into a flowing liquid and subsequently removed when it has fulfilled its function. It is also known that water can be treated by irradiation with UV light, and it has been proposed that a high frequency electromagnetic field can be utilised for this purpose. Flocculation has essentially been effected by chemical treatment.

SUMMARY OF THE INVENTION

It is broadly the object of the present invention to provide an improved fluid treatment for bactericidal and flocculation purposes.

According to one aspect of the present invention, I provide apparatus for treating a fluid contained in a conduit, comprising first and second core elements of magnetically conductive material adapted to be mounted to the conduit to surround same at spaced positions therealong; and means for establishing radio frequency magnetic fluxes in said core elements, for generating respective electromagnetic fields in the fluid to be treated extending from spaced positions along the conduit.

The means for establishing radio frequency magnetic fluxes in the core elements may comprise respective coils through which the core elements pass which coils are energised by radio frequency electrical signals.

The electrical signals may be of square wave form or sinusoidal, or possibly other wave forms may be utilised.

The core elements may be of ferrite material, and may be openable from a closed ring configuration to enable them to be applied to a conduit such as a pipe from the side (ie. not have to be placed over the conduit from an end thereof).

The frequencies of the signal applied to the core elements may be the same as one another or differ from one another.

According to another aspect of the invention, I provide a method of treatment of fluid flowing in a conduit, comprising providing core elements of magnetically conductive material surrounding the conduit spaced from one another lengthwise of the conduit, and establishing radio frequency magnetic fluxes in said core elements thereby to establish radio frequency electric fields in the fluid in the conduit originating at spaced positions along the conduit.

Treatment of fluid in a conduit in this way is effective to kill bacteria in the conduit and to cause flocculation of particles suspended in the fluid, including algae.

The method may further comprise filtering the fluid subsequent to the treatment with the electric field, to remove such flocculated suspended particles.

BRIEF DESCRIPTION OF THE DRAWINGS

The invention will now be described by way of example with reference to the accompanying drawings, of which

DETAILED DESCRIPTION OF THE PREFERRED EMBODIMENTS

Figure 1:
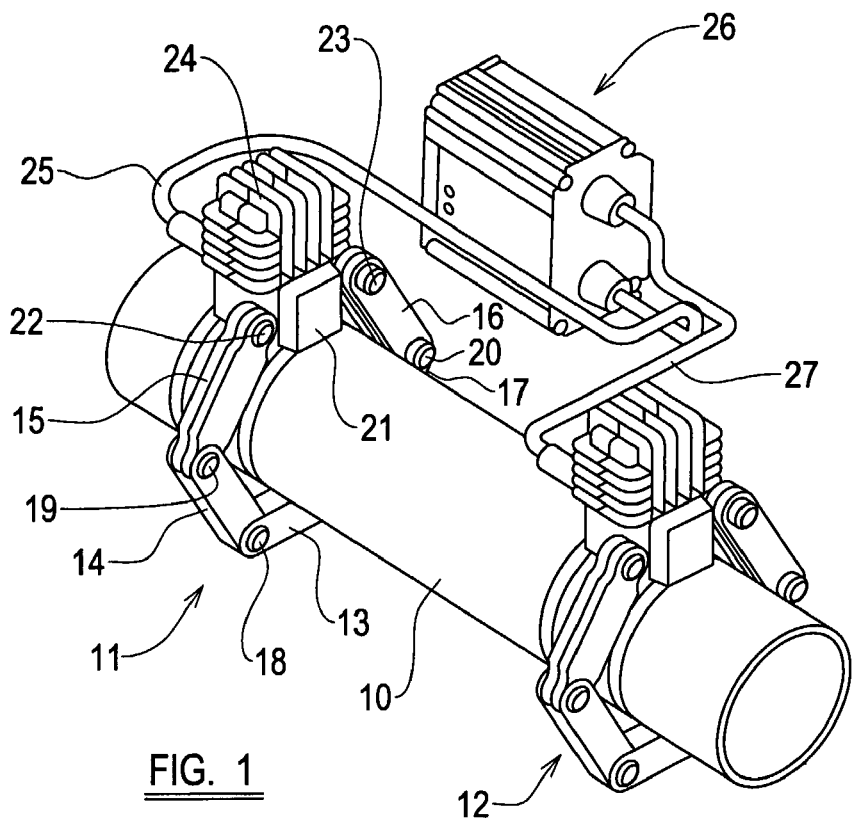
FIG. 1 is a diagrammatic illustration of apparatus in accordance with the invention, applied to a conduit such as a water-carrying pipe.

Referring firstly to FIG. 1, this illustrates a conduit in the form of a pipe 10 for carrying water. It may be a plastics or a copper pipe. Surrounding the conduit and spaced from one another therealong are first and second core elements indicated generally at 11,12 which are identical or substantially identical to one another and of which only one will therefore be described in detail. The core element 11 is made of a magnetically conductive material preferably a suitable ferrite material and comprises a number of individual elements of such material contained within respective casing parts, those elements visible in the drawing being indicated at 13,14,15, 16 and 17, joined to one another at intercalating end portions of the elements by fasteners passed therethrough as visible at 18,19,20. The core element is completed by a final element 21 joined to the elements 15,16 by respective further fasteners 22,23. The fastener 22 and/or the fastener 23 may be disconnectable, e.g. a removable screw, to enable the core element to be openable from its closed ring configuration, to enable it to be placed laterally onto the conduit 21 (ie. not have to be placed thereon by sliding from an end of the conduit).

A primary coil of electrical conductor is disposed in a housing 24 associated with the core element 21, the coil surrounding the core element. This is connected by wiring 25 to a radio frequency signal generator contained within a signal generator unit 26. Similarly the signal generator unit 26 is connected by wiring 27 to a corresponding primary coil of the core element 12.

The electrical signals generated by the signal generator 26 and applied to the primary coils of the magnetic core elements 11,12 surrounding the conduit 10 are radio frequency signals, and may be sinusoidal, square wave, or any other appropriate wave form. They may be successive diminishing signals, for example as disclosed in my European patent 493559 or 720588. The frequencies of the signals applied to the two core elements may be the same as one another or different from one another, eg. the frequency of the signal applied to the core element which is downstream having regard to the normal direction of flow of water in the conduit 10 may be lower than that of the upstream core element.

Figure 2:
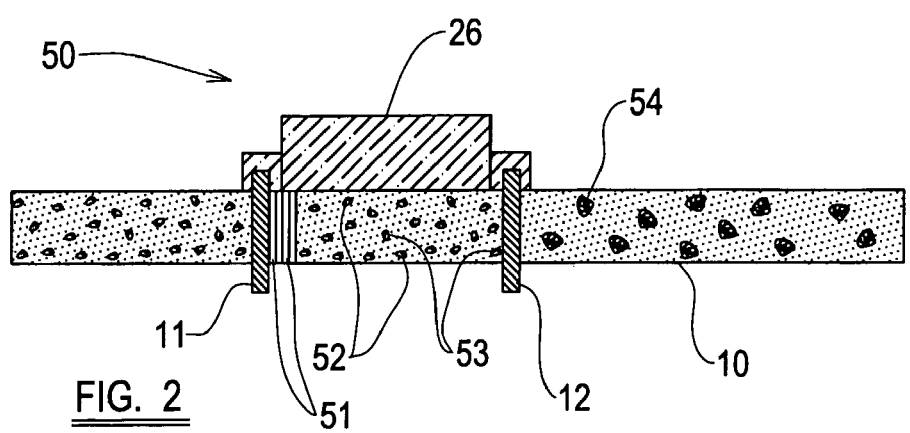
FIG. 2 illustrates diagrammatically the manner of operation of the invention as illustrated in FIG. 1.

The application of the signals as above described to the magnetic core elements establishes radio frequency electric fields, emanating from the core elements, in the water in the conduit. FIG. 2 shows diagrammatically the conduit 10 with the core elements 11, 12 therearound, connecting to the signal generator units 26. The direction of flow of water in the conduit 10 is shown by arrow 50, and if the core element 11 is energised by a signal such as a square wave or other wave form alternately going positive and negative about a mean voltage of zero it can be regarding as producing in the water down stream of the core element a number of zones within which particles and bacteria in the water are alternatively positively and negatively charged. The dimension of each such zone, as indicated at 51 in FIG. 2, in the direction of the length of the conduit 10 depends upon the speed at which the water is flowing in the conduit. For example for a signal frequency of 100 kHz and the speed of water flow of 10 m per second, each such zone will be 0.05 mm long in the direction of the length of the conduit. Thus particles and bacteria as indicated at 52 downstream of the core element 11 will be positively or negatively charged, as indicated at 52, 53. When particles such as bacteria or other suspended particles in the water have acquired a charge, water molecules adjacent a bacterium orient and position themselves in such a way that a layer of pure water surrounds the bacterium. The result is that the cell membrane of the bacterium is subject to osmotic pressure depending on the different concentrations of solute inside and outside the membrane, which will eventually cause rupture of the membrane and death of the bacterium.

When bacteria laden water is flowing in the conduit, it is possible the osmotic effect due to the field established by the first of the core elements encountered by a bacterium may not be sufficient to kill the bacterium. In this case, the field established by the following core element will cause violent movement of the charged bacterium, which will destroy it.

The charges on the particles and bacteria in the water in the conduit, as described above, also cause flocculation of suspended solid particles and charged bacteria also are trapped in the flocculate. Downstream of the second core element 12, flocculated particles and bacteria are indicated at 54. Such flocculated particles may be removed by filtration.

Water treatment as above described may be carried out in water supply systems, eg. cold water supply systems or hot water supply systems. In relation to hot water supply systems, heating systems in hospitals for example are designed to heat water to 60° C. or above to ensure destruction of bacteria in the system. Any scale deposits may mean that lower temperatures are reached so that the bacteria are not effectively eliminated. However, installation of apparatus as above described in a circulating hot water system together with a self cleaning filter is effective to remove from the system flocculated particles and dead bacteria. The apparatus is also effective to reduce or eliminate scale formation in the system.

Figure 3:
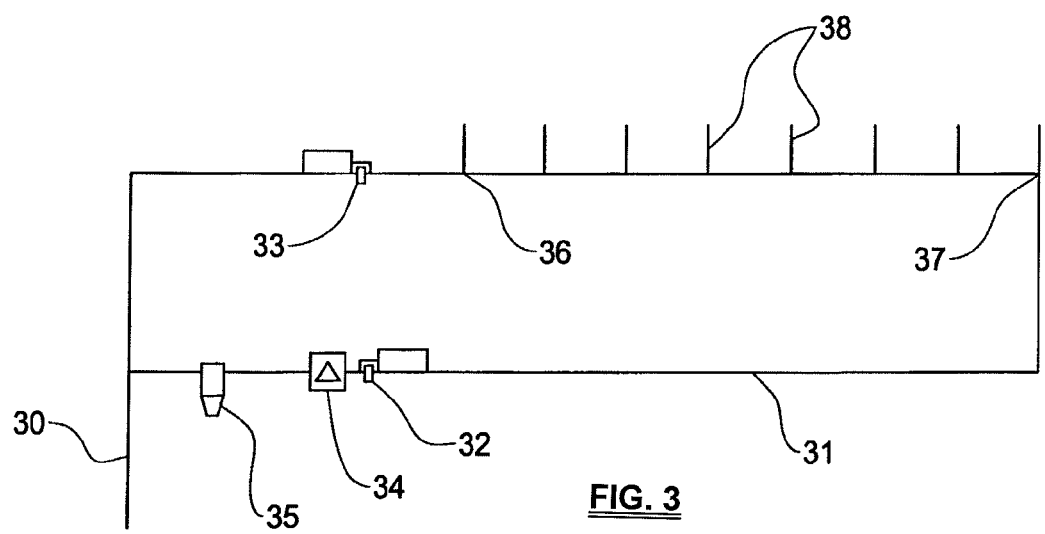
FIG. 3 is a diagrammatic illustration of part of a cold water system with the invention applied thereto.

Referring now to FIG. 3 of the drawings, this shows a cold water supply system with the invention applied thereto. This shows a mains cold water supply pipe 30, leading to a distribution loop 31. The loop 31 includes a first apparatus 32 as above described, a further such apparatus 33, a pump 34, and a filter 35. Between points 36,37 on the loop 31 there are a number of outlets 38 for delivery of cold water to consumers.

The pump 34 circulates water in the loop 31 past the two treatment apparatuses 32,33, while the filter 35 traps flocculated solid material. The filter may be a self-cleaning filter, in which accumulated flocculated matter is periodically removed eg by back-flushing and disposal of the cleared material.

Figure 4:
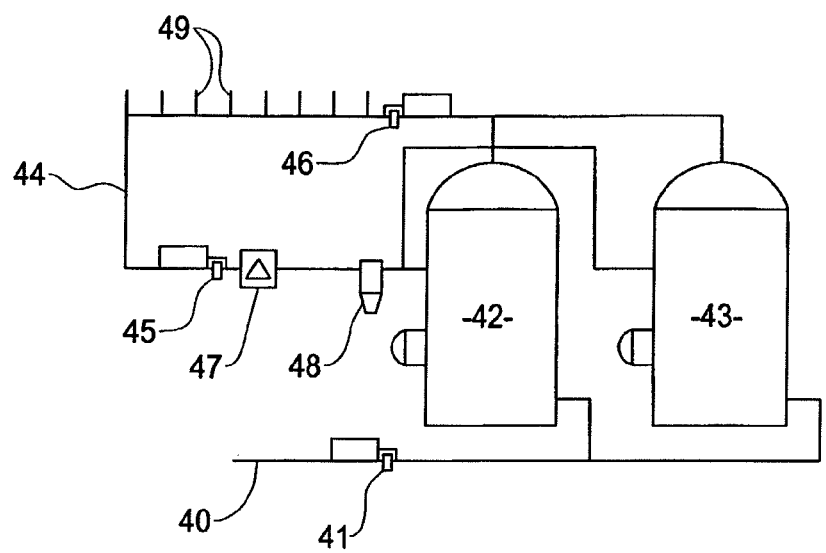
FIG. 4 is a diagrammatic illustration of part of a hot water system with the invention applied to it.

Referring now to FIG. 4 of the drawings, this illustrates the application of the invention to a hot water system. The system includes a cold water supply pipe 40 in which is provided a treatment apparatus 41 as above described. This delivers cold water to two calorifiers 42,43 connected in parallel with one another to heat the water. A hot water supply loop 44 includes first and second treatment apparatuses 45,46 as above described, a pump 47, and a filter 48, the pump 47 circulating the hot water through the loop 44 including the calorifiers 42 and 43. A number of outlets from the loop are indicated at 49.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A water supply system, comprising:
a supply pipe including a closed loop of pipework;
a pump for circulation of water around the closed loop;
treatment apparatus in the closed loop for treating the water therein, the treatment apparatus including first and second core elements of magnetically conductive material arranged to surround the supply pipe at spaced positions therealong;
means for establishing radio frequency magnetic fluxes in the core elements, including respective coils through which the core elements pass, the coils being capable of energization by radio frequency electrical signals of different frequencies from one another, for generating respective electromagnetic fields in the water extending from the spaced positions along the supply pipe.

2. The water supply system according to claim 1, further characterized in that the closed loop includes a filter for removal of flocculated matter.

3. The water supply system according to claim 1, further characterized in that at least another treatment apparatus is provided in the closed loop.

4. The water supply system according to claim 1, further characterized in that the electrical signals are of square or sinusoidal waveform.

5. The water supply system according to claim 1, further characterized in that the core elements are of ferrite material.

6. The water supply system according to claim 1, further characterized in that the core elements are openable from a closed ring configuration to enable them to be applied to a conduit from a side thereof.

* * * * *